(12) United States Patent
Barth et al.

(10) Patent No.: US 9,920,775 B2
(45) Date of Patent: Mar. 20, 2018

(54) DISTRIBUTED PISTON ELASTOMERIC ACCUMULATOR

(71) Applicant: Vanderbilt University, Nashville, TN (US)

(72) Inventors: Eric J. Barth, Nashville, TN (US); John M. Tucker, Nashville, TN (US)

(73) Assignee: VANDERBILT UNIVERSITY, Nashville, TN (US)

( * ) Notice: Subject to any disclaimer, the term of this patent is extended or adjusted under 35 U.S.C. 154(b) by 0 days.

(21) Appl. No.: 15/012,837

(22) Filed: Feb. 1, 2016

(65) Prior Publication Data

US 2016/0230781 A1    Aug. 11, 2016

Related U.S. Application Data

(62) Division of application No. 13/328,182, filed on Dec. 16, 2011, now Pat. No. 9,249,847.

(51) Int. Cl.
| | |
|---|---|
| *F16L 55/04* | (2006.01) |
| *F15B 1/16* | (2006.01) |
| *B60T 1/10* | (2006.01) |
| *B60T 7/04* | (2006.01) |
| *B60T 8/42* | (2006.01) |

(Continued)

(52) U.S. Cl.
CPC ............... *F15B 1/165* (2013.01); *B60T 1/10* (2013.01); *B60T 7/042* (2013.01); *B60T 8/42* (2013.01); *F15B 1/04* (2013.01); *F16D 61/00* (2013.01); *F15B 2201/20* (2013.01);

(Continued)

(58) Field of Classification Search
USPC ........................................ 138/30, 31
See application file for complete search history.

(56) References Cited

U.S. PATENT DOCUMENTS

| 315,453 A | 4/1885 | Waddell |
|---|---|---|
| 2,337,771 A | 12/1943 | Roberts |

(Continued)

FOREIGN PATENT DOCUMENTS

| CN | 1081746 | 2/1994 |
|---|---|---|
| CN | 1871439 | 11/2006 |

(Continued)

OTHER PUBLICATIONS

Ashby, M.F., "Materials Selection in Mechanical Design", Pergamon Press, Oxford, 1992, 99. 32-35.

(Continued)

*Primary Examiner* — James Hook
(74) *Attorney, Agent, or Firm* — Parker Highlander PLLC

(57) ABSTRACT

The present invention is a distributed piston elastomeric accumulator which stores energy when its elastomeric member stretches from its original length in response to the flow of a pressurized fluid. The stored energy is returned when the fluid flow is reversed and the accumulator discharges the fluid as its elastomeric member returns to its original length and moves the piston to its initial position. At least one part of the novelty of the invention is that the accumulator is not subject to radial strain gradients and the accumulator allows for precise pressure and linear position measurements. Accordingly, the invention allows for optimization of the energy strain storage capacity of a given elastomer.

8 Claims, 9 Drawing Sheets

(51) Int. Cl.
*F15B 1/04* (2006.01)
*F16D 61/00* (2006.01)

(52) U.S. Cl.
CPC ....... *F15B 2201/21* (2013.01); *F15B 2201/31* (2013.01); *F15B 2201/405* (2013.01); *Y02E 60/15* (2013.01)

(56) References Cited

U.S. PATENT DOCUMENTS

| | | | |
|---|---|---|---|
| 2,401,791 A | 6/1946 | Overbeke | |
| 2,721,580 A | 10/1955 | Greer | |
| 2,875,789 A * | 3/1959 | Wright | F16L 55/052 138/31 |
| 3,075,558 A * | 1/1963 | Von Forell | F15B 1/12 138/30 |
| 3,084,717 A | 4/1963 | Purcell | |
| 3,142,318 A | 7/1964 | Mercier | |
| 3,148,706 A | 9/1964 | Mercier | |
| 3,162,213 A | 12/1964 | Peters | |
| 3,230,975 A | 1/1966 | Mercier | |
| 3,353,606 A | 11/1967 | Dyer | |
| 3,442,292 A * | 5/1969 | Candido | F15B 1/10 138/30 |
| 3,473,565 A | 10/1969 | Biendermann | |
| 3,514,220 A * | 5/1970 | Hahn, Jr. | F04B 11/0033 137/565.34 |
| 3,528,344 A * | 9/1970 | Ravenhorst | F16J 3/047 73/716 |
| 3,581,774 A | 6/1971 | Oeland et al. | |
| 3,625,242 A | 12/1971 | Ostwald | |
| 3,632,557 A | 1/1972 | Brode et al. | |
| 3,791,557 A | 2/1974 | Venus | |
| 3,797,516 A | 3/1974 | Forster et al. | |
| 3,893,485 A * | 7/1975 | Loukonen | F16L 55/053 138/30 |
| 3,907,000 A | 9/1975 | Carr | |
| 3,920,047 A | 11/1975 | Mercier | |
| 3,933,172 A | 1/1976 | Allen | |
| 3,946,759 A | 3/1976 | Mercier | |
| 3,993,069 A | 11/1976 | Buckles et al. | |
| 4,000,758 A | 1/1977 | Meisenheimer | |
| 4,064,911 A * | 12/1977 | Albrecht | F15B 1/103 138/30 |
| 4,162,692 A | 7/1979 | Greer et al. | |
| 4,206,908 A | 6/1980 | Mercier | |
| 4,315,562 A | 2/1982 | Tangorra et al. | |
| 4,333,553 A | 6/1982 | Hoppie et al. | |
| 4,364,416 A | 12/1982 | Jacobellis et al. | |
| 4,413,652 A | 11/1983 | Allewitz | |
| 4,427,028 A | 1/1984 | Jacobellis | |
| 4,448,217 A | 5/1984 | Mercier | |
| 4,479,356 A | 10/1984 | Gill | |
| 4,509,557 A | 4/1985 | Sugimura | |
| 4,520,840 A | 6/1985 | Michel | |
| 4,533,067 A | 8/1985 | Sansevero et al. | |
| 4,651,781 A | 3/1987 | Kandelman | |
| 4,741,155 A | 5/1988 | McCarty | |
| 4,751,155 A | 6/1988 | Binder et al. | |
| 4,793,381 A | 12/1988 | Sugimura | |
| 5,152,455 A | 10/1992 | Palmers | |
| 5,405,409 A | 4/1995 | Knoth | |
| 5,456,787 A | 10/1995 | Myles | |
| 5,511,759 A | 4/1996 | DeKraker | |
| 5,655,569 A | 8/1997 | Tackett | |
| 5,671,884 A | 9/1997 | Restive | |
| 5,682,923 A | 11/1997 | Goloff et al. | |
| 5,709,248 A | 1/1998 | Goloff | |
| 5,755,361 A | 5/1998 | Restive et al. | |
| 5,806,705 A | 9/1998 | Herald et al. | |
| 5,814,064 A | 9/1998 | Daniel et al. | |
| 5,857,618 A | 1/1999 | Restive | |
| 5,938,116 A | 8/1999 | Restive et al. | |
| 5,984,199 A | 11/1999 | Restive | |
| 6,007,582 A | 12/1999 | May | |
| 6,071,460 A | 6/2000 | Renaudin et al. | |
| 6,200,114 B1 | 3/2001 | Brighton et al. | |
| 6,267,147 B1 | 7/2001 | Rago | |
| 6,336,467 B1 | 1/2002 | Schneider | |
| 6,412,476 B1 * | 7/2002 | Thompson | B60K 15/077 123/516 |
| 6,564,830 B1 | 5/2003 | Smith | |
| 6,877,965 B2 | 4/2005 | McCall et al. | |
| 7,000,806 B2 | 2/2006 | Py et al. | |
| 7,306,006 B1 | 12/2007 | Cornell | |
| 7,841,432 B2 | 11/2010 | Lynn et al. | |
| 7,913,791 B2 | 3/2011 | Rose et al. | |
| 8,201,582 B2 | 6/2012 | Stroganov et al. | |
| 8,434,524 B2 | 5/2013 | Barth et al. | |
| 2002/0002118 A1 | 1/2002 | Brandt | |
| 2002/0153687 A1 | 10/2002 | Howard | |
| 2005/0096171 A1 | 5/2005 | Brown et al. | |
| 2006/0037658 A1 | 2/2006 | Shimbori et al. | |
| 2007/0126284 A1 | 6/2007 | Swain et al. | |
| 2008/0308168 A1 | 12/2008 | O'Brien et al. | |
| 2009/0007980 A1 | 1/2009 | Hall et al. | |
| 2009/0165451 A1 | 7/2009 | Mueller et al. | |
| 2011/0079140 A1 | 4/2011 | Baseley | |
| 2012/0216900 A1 | 8/2012 | Liermann et al. | |

FOREIGN PATENT DOCUMENTS

| | | |
|---|---|---|
| CN | 101331355 | 12/2008 |
| DE | 1959030 | 5/1971 |
| DE | 2551580 | 5/1977 |
| EP | 0088739 | 9/1983 |
| FR | 2 456 238 | 12/1980 |
| GB | 1207594 | 10/1970 |
| JP | 4630711 | 9/1971 |
| WO | WO 2008/045468 | 4/2008 |
| WO | WO 2010/117853 | 10/2010 |

OTHER PUBLICATIONS

Extended European Search Report issued in corresponding European Application No. 11 87 7244, dated Sep. 1, 2015.

Pedchenko, A., and Barth, E., "Design and Validation of a High Density Elastic Accumulator Using Polyurethane", ASME 2009 Dynamic Systems and Control Conference, Hollywood, California, Oct. 12-14, 2009, vol. 1, pp. 283-290.

Pourmovahed, A., "Energy Storage Capacity of Gas-Charged hydraulic Accumulators"—AIAA Thermophysics, Plasmadynamics and Lasers Conference, Jun. 27-29, 1988, San Antonio, TX pp. 1-11.

Pourmovahed, A., Baum, SA, Fronczak, F.J., and Beachley, N.H., "Experimental Evaluation of Hydraulic Accumulator Efficiency With and Without Elastomeric Foam". Journal of Propulsion and Power, vol. 4(2), Mar.-Apr. 1988, pp. 185-192.

* cited by examiner

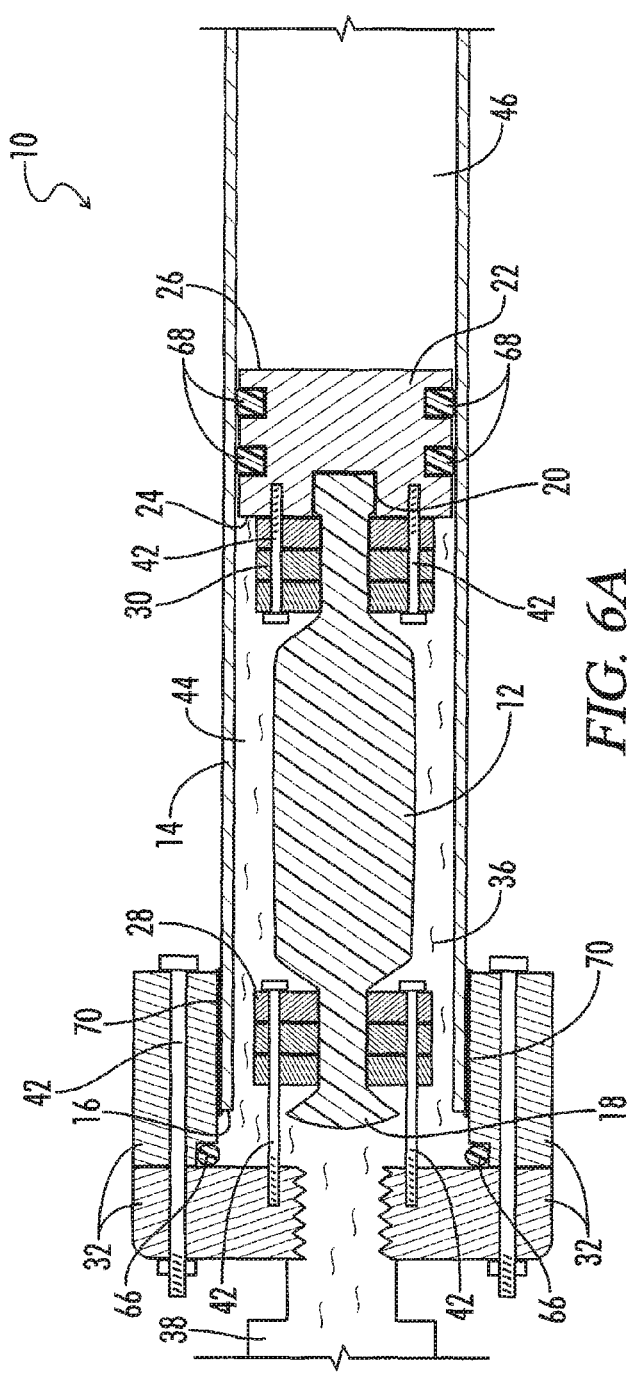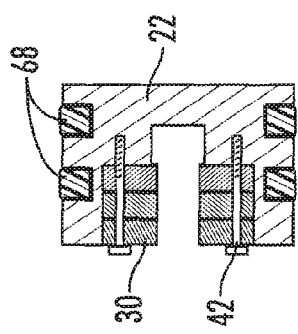
FIG. 6A
FIG. 6B

DISTRIBUTED PISTON ELASTOMERIC ACCUMULATOR

This application is a divisional of U.S. patent application Ser. No. 13/328,182, filed Dec. 16, 2011, the entirety of which is incorporated herein by reference.

The invention was made with government support under Grant No. 540834 awarded by the National Science Foundation. The government has certain rights in the invention.

BACKGROUND OF THE INVENTION

Hydraulic accumulators are entery storage devices commonly used to provide supplementary fluid power and absorb shock. One particularly interesting recent application of these devices is regenerative braking. Although a theoretically appealing concept, hydraulic regenerative braking (HRB) is difficult to implement due to some major inherent limitations and non-ideal properties of conventional accumulators.

Gas extendable membrane accumulators (or gas bladder hydraulic accumulators) and piston accumulators with a gas pre-charge (PAGPs) use gas for energy storage. In these accumulators, a gas, separated by a bladder or a piston, occupies a certain volume of a container which is otherwise filled with a fluid, typically hydraulic fluid. As fluid is forced into this container, the gas inside the separated volume is compressed and energy is stored in this compressed gas. Such accumulators are subject to two serious drawbacks: 1) inefficiency due to heat losses, and 2) gas diffusion through the extendable member into the hydraulic fluid. The drawback of inefficiency via heat loss is addressable, but the gas diffusion issues gives rise to high maintenance costs associated with "bleeding" the gas out of the fluid often.

With regard to inefficiency, if the energy stored in the compressed gas of such an accumulator is not retrieved soon, the heat flow from the gas to its immediate surrounding results in much less energy being retrieved. It has been shown that with as little as 50 seconds passing between gas compression and expansion, a piston-type gas accumulator's efficiency can fall to about 60%. Pourmovahed, A., Baum, S. A., Fronczak, F. J., and Beachley, N. H., 1988. "Experimental Evaluation of Hydraulic Accumulator Efficiency With and Without Elastomeric Foam". *Journal of Propulsion and Power*, 4(2), March-April, pp. 188. Since a vehicle remains immobile at a stop light for such a length of time or longer, this makes gas extendable member and piston accumulators with a gas pre-charge not ideal for HRB applications. Several methods to mitigate these heat losses have been proposed. For piston accumulators with a gas pre-charge, one method involves placing an elastomeric foam into the gas enclosure. This foam serves the purpose of absorbing the generated heat during gas compression that would otherwise be transferred to the walls of the gas enclosure, and ultimately lost. The foam is capable of collecting a large amount of this generated heat and returning it to the gas when the latter expands. According to Pourmovahed, "the insertion of an appropriate amount of elastomeric foam into the gas enclosure . . . [can] virtually eliminate thermal loss". Pourmovahed, A., Baum, S. A., Fronczak, F. J., and Beachley, N. H., 1988. "Experimental Evaluation of Hydraulic Accumulator Efficiency With and Without Elastomeric Foam". *Journal of Propulsion and Power*, 4(2), March-April, pp. 188. Incorporation of elastomeric foam has shown how gas-charged accumulator efficiency can be improved, however, this modification still does not solve the other problems associated with existing accumulators.

With regard to gas diffusion, the problem persists despite developments in the material used for the extendable member that separates the gas and fluid due to the fact that diffusion can be reduced but not eliminated completely. This is the case due to the pressure gradient across the bladder from the gas to the fluid. This gradient is zero when the accumulator is in static equilibrium. However, when the accumulator is discharging for example, there is a gradient of higher pressure on the gas side to lower pressure on the fluid side that drives the gas through the bladder and into the fluid. Possible solutions to this problem are to either ensure that the gas is always at a lower pressure than the fluid, or to eliminate the existence of gas altogether.

SUMMARY OF INVENTION

The present invention discloses a distributed piston elastomeric accumulator for storing hydraulic energy. The disclosed accumulator provides a new geometric approach to storing energy which solves the problems associated with gas bladder type accumulators. Accordingly, the present invention optimizes the capacity of an elastomeric material to be used to store strain energy. In addition to addressing the problem of radial strain gradients, a second feature of the present accumulator is that it can be configured such that the hydraulic fluid pressure can exceed the maximum stress experienced in the material through appropriate sizing of cross sectional areas within a single accumulator. Yet another feature of the present accumulator is that it provides an accumulator for which the energy transfer rate may be easily calculated. The disclosed accumulator provides a fluid/elastomer based system such that no pressurized gas is present, thus avoiding the problems associated with conventional gas-charged accumulators.

In certain embodiments, the accumulator includes, a housing having a first end, a cap attached to the first end of the housing, a first clamp attached to the cap, an extendable member having a first end and a second end, the first end being attached to the first clamp, the extendable member being within the housing, a second clamp attached to the second end of the extendable member, and a piston attached to the second clamp, wherein the piston slidably engages the housing. The accumulator may further include a working fluid source in fluid communication with the cap. In certain embodiments, the extendable member is an elastomer, polyurethane, or nitrile rubber. In other embodiments, the accumulator further includes a plurality of the extendable members attached to the first clamp and second clamp. In still other embodiments, the extendable member defines an opening therethrough along its axis. In certain embodiments, the extendable member defines a plurality of openings therethrough along its axis. In some embodiments, the accumulator further includes a tube attached to the working fluid source and the tube being inserted in the opening at the first end of the extendable member so that fluid may pass into the opening. In other embodiments, the accumulator further includes the piston defining an opening, wherein the second end of the extension member is received by the opening. In still other embodiments, the second clamp is received by the opening. In other embodiments, each of the first clamp and the second clamp further include a plurality of clamping members, each clamping member further including a body defining a flat surface for applying compression force, and a flange attached to the body, the flange defining a first opening for receiving a fastener therethrough, the flange defining a second opening for receiving an end of a fastener which is attached to another clamping member. In other embodiments, the plurality of clamping members include a first clamping member, a second clamping member attached to the first clamping member by a fastener, a third clamping member attached to the second clamping member by a fastener, and a fourth clamping member attached to the third clamping member by a fastener.

In other embodiments, the accumulator includes, a tubular housing having a first end, a piston having a first end and a second end, the piston slidably engaging the tubular housing, a cap attached to the first end of the tubular housing, wherein a first chamber of the housing is defined by the housing, the cap and first end of the piston so that the volume of the first chamber changes as the position of the piston changes, a first clamp attached to the cap, an extendable member having a first end and a second end, the first end being attached to the first clamp, a second clamp attached to the first end of the piston and the second end of the extendable member. In other embodiments the accumulator further includes a second chamber of the housing defined by the second end of the piston and the housing so that the second chamber is a low pressure reservoir. In still other embodiments, the accumulator includes a working fluid source in fluid connection with the first chamber. In yet other embodiments, the accumulator further includes a plurality of the extendable members attached to the first clamp and second clamp. In other embodiments, the extendable member defines an opening therethrough along its axis. In yet other embodiments, the extendable member defines a plurality of openings therethrough along its axis.

In still other embodiments, the accumulator includes a housing having a first end, a first clamp attached to the first end of the housing, an extendable member having a first end and a second end, the first end being attached to the first clamp, the extendable member being within the housing, a second clamp attached to the second end of the extendable member, and a piston attached to the second clamp, wherein the piston slidably engages the housing. In other embodiments, the first end of the housing defines an opening so that working fluid may pass. In still other embodiments, the system further includes a plurality of accumulators arranged in series and in parallel.

Accordingly, one provision of the invention is to provide an accumulator having a design to avoid radial strain gradients.

Still another provision of the invention is to provide a single accumulator whereby the hydraulic fluid pressure exceeds the maximum stress experienced in the material by a designable ratio.

Still another provision of the invention is to provide an accumulator having a design that allows for the precise pressure and linear position measurements for the calculation of energy storage and energy transfer rates.

Yet another provision of the invention is to provide an accumulator having a design that simplifies the manufacturing demands.

BRIEF DESCRIPTION OF DRAWINGS

FIG. 6A is a cross-sectional view of an embodiment of the present invention in which the second clamp is adjacent to the piston such that the end of the extendable member is positioned within a blind hole in the piston. FIG. 6B is a cross-sectional view of an embodiment of the piston in which the second clamp is positioned within the blind hole of the piston and space remains for receiving the end of the extendable member.

FIG. 8A shows a perspective view of clamping members positioned prior to attachment. Each clamping member has two sections in which fasteners may pass in order to assist with the clamping function when four of the clamp members are assembled. FIG. 8B shows a perspective view of the clamping device in a closed position.

PREFERRED EMBODIMENTS OF THE INVENTION

Figure 1:
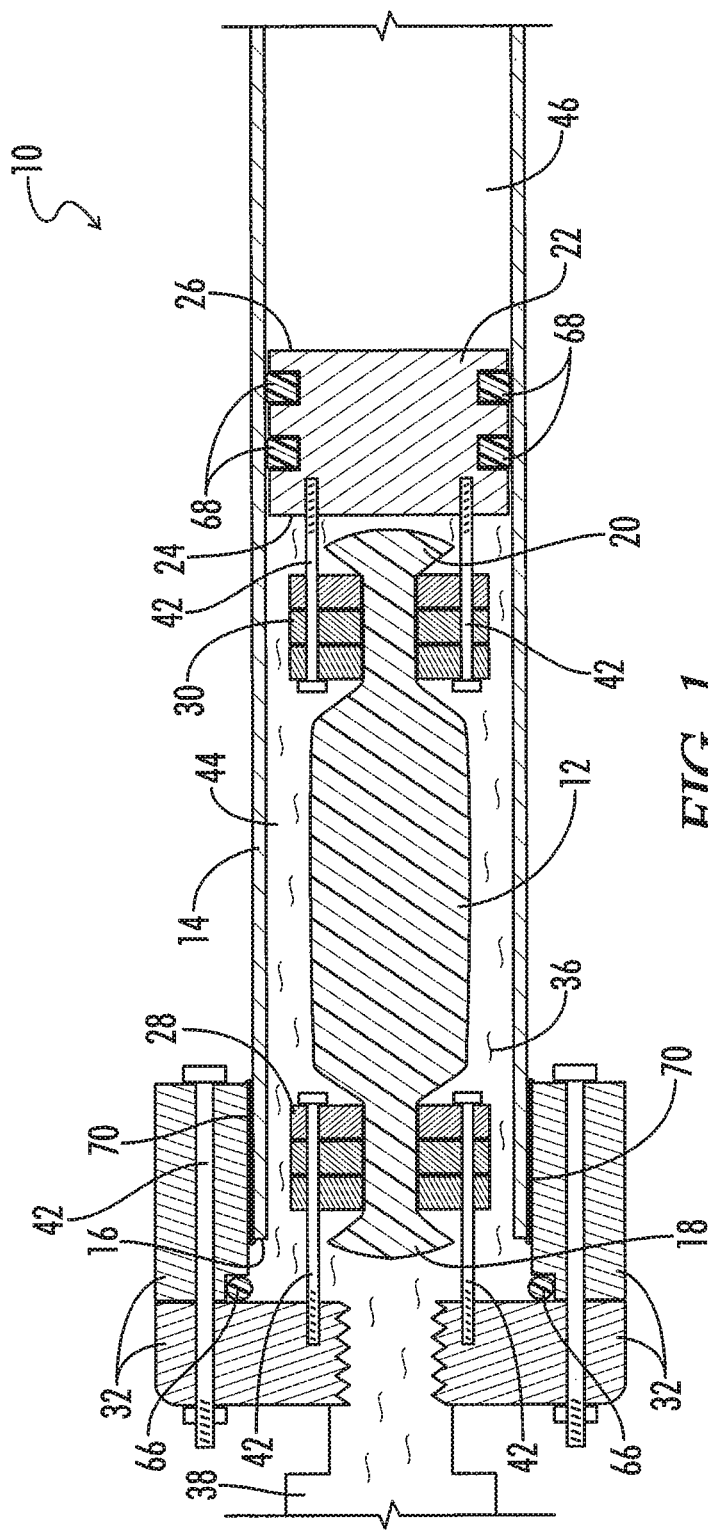
FIG. 1 is a cross-sectional view of an embodiment of the present invention. Shown therein is a first clamp holding one end of the extendable member in a fixed position and a second clamp holding the other end of the extendable manner in attachment to a piston which moves as a result of pressure. The extendable member is in a non-stretched configuration.

The present invention discloses a distributed piston elastomeric accumulator 10. This application discloses a solution to the problem of radial strain gradients which hamper balloon type elastic accumulators. As shown and described herein, the invention utilizes a high strain-energy density elastomeric accumulator (as opposed to a gas-charged or spring loaded piston accumulator) within a rigid shroud, also called a housing 14. Within the housing 14 is an extendable member 12 which is stretched along its length as working fluid 36, which may be hydraulic fluid, or other incompressible working fluid, enters the first chamber 44 of the housing 14 from a fluid source 38. The housing 14 is separated into a first chamber 44 and a second chamber 46, the chambers being divided by a piston 22 which slidably engages the housing 14 so that the volumes of the first chamber 44 and the second chamber 46 change as the position of the piston 22 moves along the length of the housing 14. Pistons 22 are known to those of skilled in the art and one of ordinary skill may select a proper piston for the function described herein. Such pistons 22 are readily commercially available. In certain embodiments, the piston 22 includes seals 68 in order to provide a fluid tight seal as described herein. Such seals 68 may be PV seals or other appropriate seals as known to those of ordinary skill in the art, all of which are readily commercially available. Working fluid 36 from a fluid source 38 enters the housing 14 by use of a pump/motor 48, or other means. In the embodiment shown, the fluid 36 enters through the cap 32. However, alternate designs may allow fluid 36 to enter through the housing 14. The working fluid 36 applies force against the extendable member 12 in two axes while the piston 22 tensions the extendable member 12 in the third axis such that the extendable member 12 stretches along that axis. As the extendable member 12 thins along its length, the cross-sectional area change creates a distributed piston effect along the area gradient. The present invention circumvents the problem of radial strain gradients by combining uniaxial piston tension with uniform hydrostatic compression. The present invention provides an accumulator 10 having a design to avoid radial strain gradients thereby increasing the strain energy density stored in the extendable member 12 material. Strain gradients can reduce the overall storage energy density in the material if configured such that hydraulic input energy in the system is required to stop when the localized strain reaches a prescribed maximum anywhere in the accumulator 10 while leaving other localized strain values lower than this maximum. That is, if you have to stop filling the accumulator 10 before all of the material has reached the prescribed maximum strain, you can not utilize the material to its maximum energy storage capacity. Volumetric energy density (energy stored per unit volume of the elastomer) is thereby maximized when the material is homogenously strained. The end benefit being optimal energy storage for the physical characteristics of the extendable member 12 within the accumulator 10 being used.

An additional benefit of some configurations of the present invention is that the hydraulic pressure can be made to exceed the maximum stress experienced in the material within a single accumulator 10. This is in contrast to a balloon-type elastomeric accumulator where the differential fluid pressure across the balloon within a single accumulator (as opposed to several arranged in series) cannot exceed the maximum stress experienced in that accumulator. With the present invention, arrangements such as FIG. 6A allow for the fluid 36 pressure to be a multiple of the maximum stress experienced in the material where that multiple is defined by the ratio of the cross sectional area of piston 22 to the cross sectional area of the clamped portion of the extendable member 12 at the piston 22 end. The ultimate utility of this feature is a single accumulator 10 where, by way of example, one could achieve a hydraulic pressure of 5,000 psi while only experiencing a maximum local stress of 2,000 psi in the material. This is important given that the allowable stresses in the elastomeric material being used may not be as high as the desired hydraulic pressure needed for the accumulator 10 to store.

An additional benefit of the present invention is that the energy transfer rate into or out of the accumulator 10 may be determined with pressure and linear position measurements alone, a more accurate and inexpensive alternative to direct flow measurement which is currently used in the art. Specifically, given that most elastic materials are incompressible and occupy appreciably the same volume regardless of shape the total combined volume of the fluid 36, which may be hydraulic fluid, plus the volume of the elastic material, will remain appreciably constant. This fact allows for the benefit described above. That is, the position of the piston 22 fully defines the volume of fluid that has been added to the first chamber 44 at any point in time. Thus, the energy transfer rate into or out of the accumulator may be determined with pressure and linear position measurements alone. In other embodiments of the present invention, linear position sensors may be utilized. Any manner of linear position sensor may be utilized including, but not limited to: linear potentiometers, linear variable differential transformers, linear optical encoders, hall effect encoders, or any of the above arranged as a rotary sensor connected to a linear to rotary transmission. Such sensors may be integrated within the accumulator 10, or may be external to the accumulator 10. Such linear position sensors are well known in the art and are readily commercially available.

For applications such as regenerative braking in a hydraulic hybrid vehicle, it is important that the hydraulic system allows for an accurate calculation of the energy transfer rate of the accumulator 10 in order to optimize performance.

Another benefit of the present invention is the clamping member 40 which may be arranged in aggregate to grasp an elastomer having any shape without ripping, tearing or otherwise compromising the character of the elastomer. Such clamping member 40 allows for positioning of the ends of an elastomer extendable member 12 so that the uniaxial stretching described herein may be performed.

Figure 2:
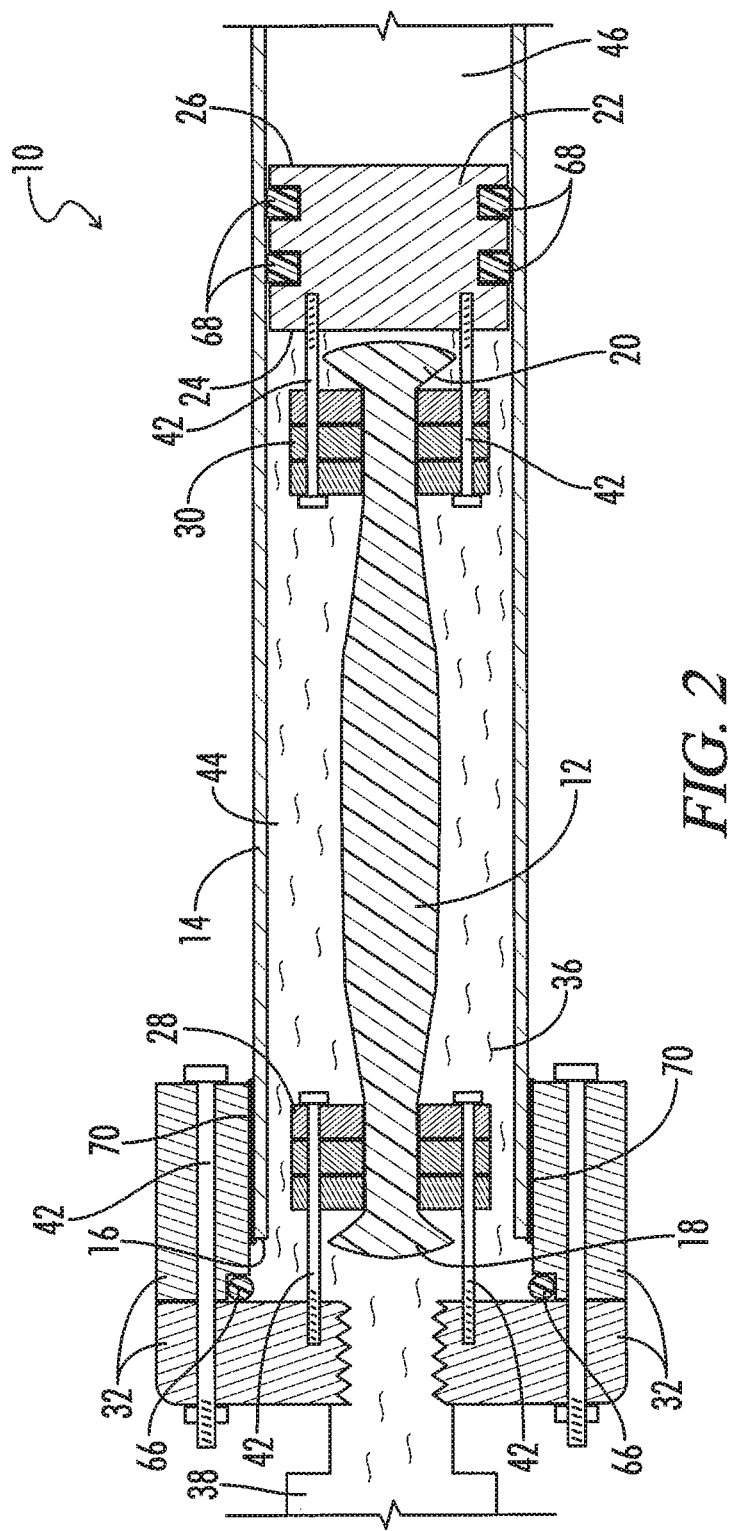
FIG. 2 is a cross-sectional view of the embodiment shown in FIG. 1 after some pressurized fluid has partially stretched the extendable member.
Figure 3:
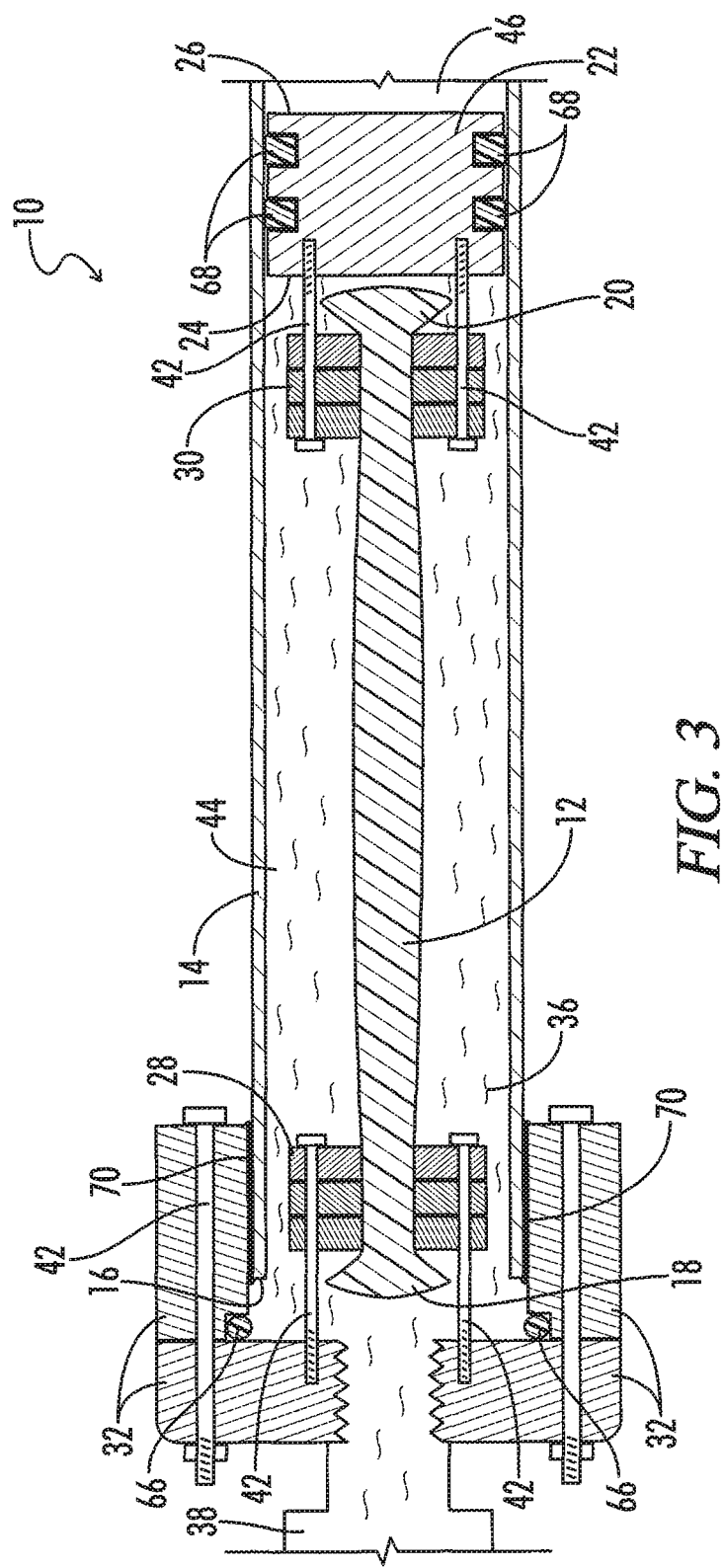
FIG. 3 is a cross-sectional view of the embodiment shown in FIG. 2 after the pressurized fluid has further stretched the extendable member. The extendable member is in a fully stretched configuration. The reverse process of the extendable member returning to its non-stretched length will forcibly eject the fluid under pressure and that fluid movement will be used to perform work.
Figure 5:
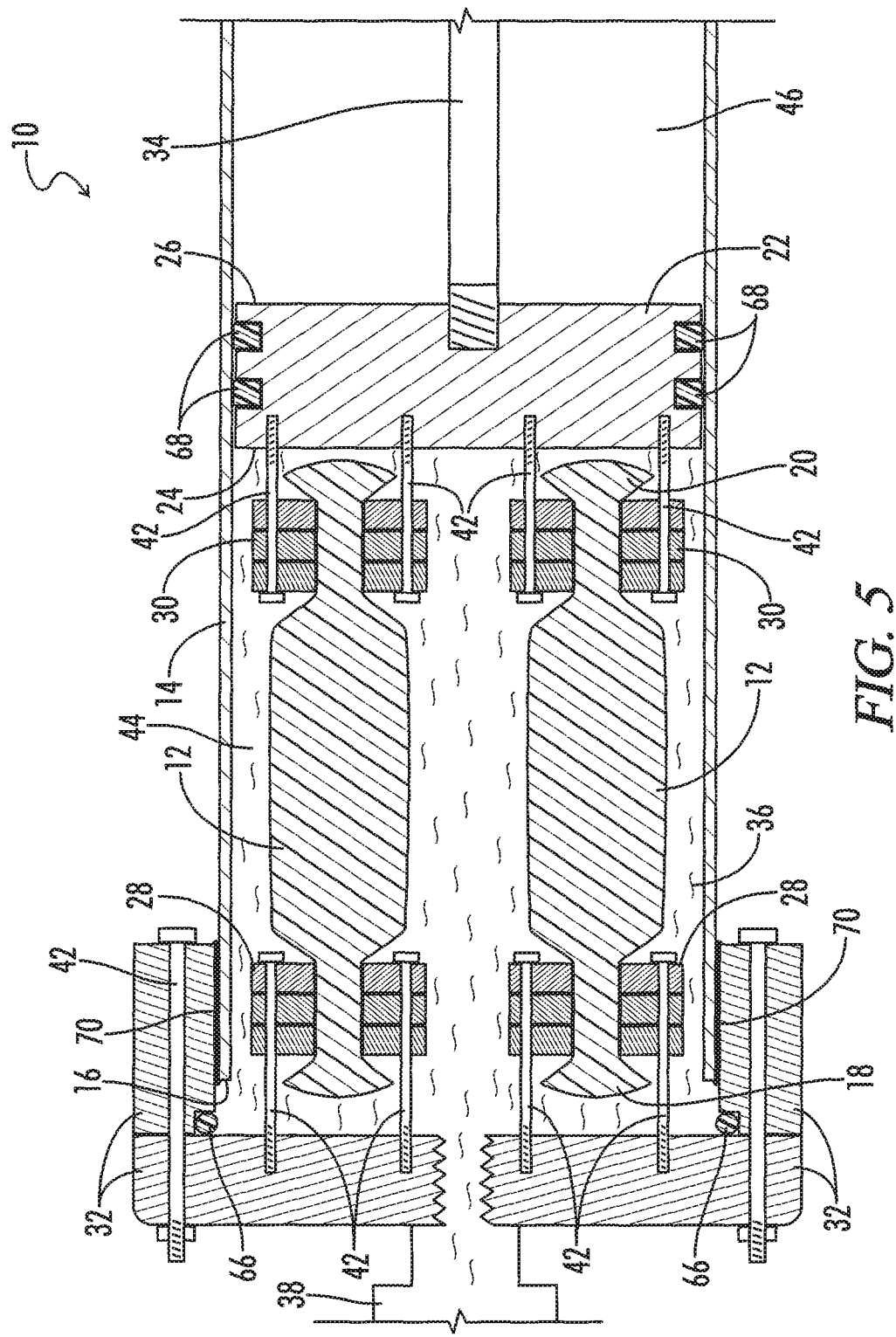
FIG. 5 is a cross-sectional view of an embodiment of the present invention in which a plurality of extendable members are positioned in non-stretched configurations.

As best seen in FIGS. 1-3, which are fully described below, an extendable member 12 is shown contained inside a rigid shroud, or housing 14. The extendable member 12 is an elastomeric material which may be stretched along its length. The housing 14 has a first end 16 to which a cap 32 is attached. The function of the cap 32 is to allow fluid communication with a source of fluid 38 so that working fluid 36 enters the housing 14. Attached to the cap 32 is a first clamp 28. Details of the clamping system disclosed herein are further provided below. The first clamp 28 is attached to the extendable member 12 in order to hold the first end 18 of the extendable member 12 in a position close to the first end 16 of the housing 14. The extendable member 12 has a second end 20 which is attached to a second clamp 30. The second clamp 30 is additionally attached to the first end 24 of a piston 22, the piston 22 slidably engaging the housing 14 such that it is capable of moving along the length of the housing 14. As fluid 36 enters the first chamber 44, which is defined by the cap 32 and the piston 22, the high pressure stretches the extendable member 12 such that the piston 22 moves away from the cap 32. As stated above, as the extendable member 12 thins along its length, the cross-sectional area change creates a distributed piston effect along the area gradient. Local increases in effective piston area cause the extendable member 12 to preferentially thin and extend first at a single location. Because of the hyperlastic behavior of the extendable member 12 material, the stiffness of the material will eventually increase exponentially, causing the deformation preference to propagate along the stiffness gradient. In certain embodiments of the invention, a rod 34 may be attached to the piston 22, as seen in FIG. 5. If the rod 34 is present, then the result of the movement of the piston 22 is the movement of a rod 34 which is attached to the second end 26 of the piston 22. In such embodiments, the rod 34 may be used for position measurement. The movement of the rod 34 is the same as the change in position of the piston 22. Such information is used for calculations. Alternatively, the rod 34 may be available to perform work related to its motion. Mechanical work may be performed by the rod 34, as known to those of ordinary skill in the art.

FIG. 1 shows the accumulator 10 in a position in which the extendable member 12 is not stretched. As fluid 36 enters the first chamber 44 the extendable member 12 starts to stretch, as best seen in FIG. 2. As fluid 36 continues to enter the first chamber 44, the extendable member 12 is fully stretched, as best seen in FIG. 3. At that point, the stored energy may be released upon activation of a control device such that the extendable member 12 is allowed to pull the piston 22 in the direction towards the cap 32 so that the fluid 36 exits the first chamber 44 and is used to perform work. In another embodiment of the present invention, the second chamber 46 may serve as a low pressure reservoir.

Figure 4:
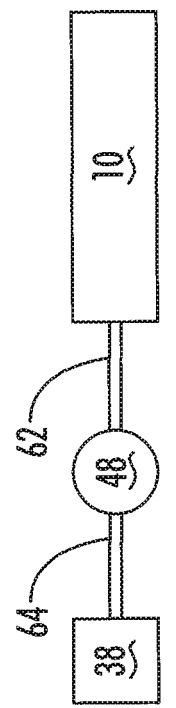
FIG. 4 is a schematic diagram of an embodiment of the invention in which a working fluid source is available to a pump/motor and the pump/motor then pumps pressurized working fluid into the accumulator. The resulting stored strain energy is then used at a point in the future.

Referring now to FIG. 4, shown there is an embodiment of the present invention including a hydraulic pump/motor 48 connected by a conduit 62 to the first chamber 44 of the accumulator 10. The pump/motor 48 is connected by a conduit 64 to a working fluid source 38. This embodiment is shown for an application such as regenerative braking whereby the pump/motor 48 is physically connected to the power-train of an automobile. When the pump/motor 48 is absorbing mechanical energy, it acts as a pump and moves hydraulic fluid 36 into the high pressure side of the accumulator 10, stretching the extendable member 12. When the pump/motor 48 acts as a hydraulic motor to deliver the energy stored in the extendable member 12 (stored in the form of strain energy of the elastic material of the extendable member 12) to shaft work at the output of the motor, the extendable member 12 forces high pressure hydraulic fluid 36 through the motor from the first chamber 44 of the accumulator 10. In certain embodiments of the invention, hydraulic actuators and valves are connected to either the high or low pressure side as known to those of ordinary skill in the art. Such actuators and valves are well known in the art and are readily commercially available. In still other embodiments of the invention, a small low pressure reservoir (of the conventional type) may also be connected as needed to the low pressure side—this, for example, would be needed to account for the asymmetric volume of fluid of single-rodded hydraulic pistons.

In certain embodiments of the invention, the accumulator 10 is a closed and sealed system. In other embodiments, there will be open systems. Such open systems include an overflow reservoir.

The extendable member 12 repetitively stretches along its length and returns appreciably to its original shape without fatigue. Surrounding the extendable member 12 of the accumulator 10 is a housing 14 which bears the high pressure resulting from the working fluid 36. As described above, in use, a fluid 36, such as hydraulic fluid, enters the first chamber 44 of the housing 14 under pressure generated by a pump/motor 48 and stretches the extendable member 12 along its length so that the piston 22 moves away from the first end 16 of the housing 14, as best seen in FIGS. 1-3. When it is desirable to retrieve the stored energy, fluid flow is reversed and forcibly ejected, thereby converting strain energy back into hydraulic energy as the extendable member 12 shortens to its original length as shown in FIG. 1.

Hydraulic Accumulators

By way of background, for a hydraulic accumulator the volumetric system energy density can be derived using the following equations:

$$V_{fluid} = \frac{E_{stored}}{P} \tag{1}$$

$$V_{storage\_device} = \frac{E_{stored}}{e_{storage\_device}} \tag{2}$$

Where $V_{fluid}$ is the volume of the fluid used for energy storage, $E_{stored}$ is the amount of energy stored in the system, P is the pressure at which energy storage occurred, $V_{storage\_device}$ is the volume of the energy storage device (where the energy storage device is defined as everything other than pressurized fluid), and $e_{storage\_device}$ is the volumetric energy density of the energy storage device. Using equations (1) and (2) in conjunction with the definition of volumetric energy density we obtain the system volumetric energy density, $e_{system}$:

$$e_{system} = \frac{E_{stored}}{V_{storage\_device} + V_{fluid}} \tag{3}$$

Energy storage of 200 kJ of energy (3500 lbs at 35 mph) at a peak power of 90 kW (35 mph to zero in 4.5 second) is needed in a package of acceptable weight and volume for a compact to midsized passenger vehicle (accumulator system energy density >10 kJ/liter). The present invention aims to remedy the problems of traditional accumulators by (i) reducing fabrication cost, (ii) eliminating the need for maintenance caused by gas diffusion by avoiding the use of a gas pre-charge, and (iii) greatly reducing the loss of energy due to heat transfer to the environment compared to that present in a conventional gas pre-charged accumulator. In part, the problems of traditional accumulators are avoided as the present invention uses an energy storage mechanism not traditionally utilized in existing accumulators.

As background, a conventional braking system uses friction between brake pads and a brake disk or drum to slow a vehicle. This method results in energy being dissipated as heat. In contrast, regenerative braking harnesses the kinetic energy of a vehicle during braking, instead of letting it dissipate in the form of heat. This collected energy can then be used in vehicle acceleration, thereby increasing the fuel efficiency, or more generally increasing the efficiency of use of the primary stored energy which can be in several forms including but not limited to hydrocarbon fuel. Hydraulic regenerative braking (HRB), specifically, decelerates wheel rotation by having the drivetrain operate a pump that pumps a fluid into a device which resists this fluid's flow and stores the resulting decrease in the kinetic energy of the vehicle. Although a theoretically appealing concept, hydraulic regenerative braking is difficult to implement due to some major inherent weaknesses of conventional accumulators.

The primary weakness of spring piston accumulators that prohibits them from being used in HRB is their low gravimetric energy density. Using linear analysis, spring steels and titanium alloys have a gravimetric energy density of around 1 to 1.5 kJ/kg. M. F. Ashby, *Materials Selection in Mechanical Design*, Pergamon, Oxford, 1992. Consequently, in order to store enough energy to bring a mid-sized 4-door sedan (mass=3500 lb (1590 kg)) to rest from 35 mph (15.65 m/s), the accumulator spring would have to weigh somewhere from 130 kg to 195 kg. In automotive manufacturing, where minimizing vehicle weight is vital, including such a heavy component would be largely impractical.

Design of the Present Invention

In order to ensure that the design of the present invention is suitable for implementation in HRB for a passenger vehicle, rough performance criteria exist, which include: (i) capable of storing 200 kJ of energy at a peak power of 90 kW; (ii) volumetric energy density of 5 MJ/m$^3$ or above; (iii) gravimetric energy density of 5 kJ/kg or above. The 200 kJ storage capacity requirement was arrived at by using the classical mechanics equation for kinetic energy, equation four ("Eq. (4)"), below, where $E_k$ is kinetic energy in joules ("J"), m is mass in kg and v is velocity in meters per second (m/s).

$$E = \tfrac{1}{2}mv^2 \qquad (4)$$

An average 4-door sedan has a mass of approximately m=3500 lbs (1590 kg). Working under the simplifying assumption that a vehicle of this weight is a point mass experiencing translational rigid body motion of v=35 mph (56.3 km/h) without rotation (allowing the use of Eq. (4)), $E_k$=194,713 J≈200 kJ. This number represents the amount of energy that would be dissipated as heat in traditional braking to stop the vehicle. In HRB, this is the amount of energy that the system should capture, assuming 100% efficiency.

The gravimetric energy density requirement was prescribed to 5 kJ/kg in order to ensure that the accumulator 10 would not significantly augment the vehicle's weight. Under this constraint, an accumulator 10 capable of storing 200 kJ of energy would weigh no more than 40 kg, barring the working fluid. The volumetric energy density restriction was chosen to be similar to the volumetric energy density of titanium alloys. This limit guarantees that the accumulator 10 will not take up more than 0.04 m$^3$, excluding the working fluid.

For example, to see which materials meet the energy density requirements, CES Material Selector version 4.8.0 was used, which is readily commercially available, from Granta Design Limited. The CES Material Selector is a software package with an extensive materials and manufacturing processes database; it was employed specifically for its capability to graphically compare user defined material properties. In the initial selection process all material groups were considered. The material volumetric energy density values of certain groups were calculated under the assumption of linear elasticity using Eq. (5), $$u = (\sigma_y^2)/(2E) \qquad (5)$$

where u is volumetric energy density of the material in J/m$^3$, $\sigma_y$ is the material's yield stress in Pa and E is the material's elastic modulus in Pa. The material's gravimetric energy densities in J/kg, represented by e, were then calculated by simply dividing a given material's volumetric energy density in J/m$^3$ obtained from Eq. (5), u, by its mass density in kg/m$^3$, $\rho$, as shown in Eq. (6).

$$e = u/\rho \qquad (6)$$

Several elastomeric materials boast much higher values for both volumetric and gravimetric energy densities than those exhibited by other material families. Of these elastomeric materials, polyurethane and natural rubber not only greatly exceed the specified target metrics for energy densities, but also surpass all other materials in these categories. In fact, polyurethane's gravimetric energy density is about two orders of magnitude higher than that of titanium alloys. Although both rubber and polyurethane appear to be suitable materials for construction of the extendable member 12, due to the larger possible maximum values and its commercial availability, polyurethane is a good choice of material for the invention described herein, in certain embodiments. It is important to note here that strain hardening makes the application of linear elasticity to elastomers a practice that should be used cautiously. In order to obtain a far more accurate estimate of energy storage capabilities, a stress-strain curve of the material should be reviewed.

The use of straining for purposes of storing energy is further discussed conceptually below, in relation to the selection of a material of construction for the extendable member 12. An accumulator 10 will follow a type of expansion behavior that stores energy in the accumulator 10 estimated using Eq. (7).

$$E_{est} = P_{ave}(V_f - V_i) \qquad (7)$$

$E_{est}$ is an estimate of stored energy in J, $P_{ave}$ is the average gauge pressure over the fill volume at which expansion propagates in Pa, $V_{init}$ is the initial volume occupied by the accumulator 10 containing the working fluid before it is loaded, and $V_f$ is the maximum volume occupied by the accumulator 10 containing the working fluid at the end of loading in m$^3$.

Using Eq. (7) and letting $E_{est}$ equal 200 kJ, estimates for $(V_f - V_{init})$ were obtained for different $P_{ace}$ values. Additionally, assuming a working fluid of a similar density to hydraulic fluid (taken to be $\rho_{hyd}$=890 kg/m3), the obtained $(V_f - V_{init})$ estimates were in turn used to obtain change in system mass approximations in kg, $M_f$. Values for $(V_f - V_{init})$ and $M_f$ that would result in energy storage of 200 kJ for different values of $P_{hold}$, are shown below. The values are the volume and mass estimates for working fluid.

| $P_{ave}$, psig [kPa] | $(V_f - V_{init})$, ft$^3$ [m$^3$] | $M_f$, lb [kg] |
|---|---|---|
| 3000 [20786] | 0.333 [0.0094] | 18.45 [8.37] |
| 4000 [27680] | 0.250 [0.0071] | 13.93 [6.32] |
| 5000 [34575] | 0.200 [0.0057] | 11.18 [5.07] |

As can be seen above, for the accumulator system capable of functioning with $P_{ave}$ values ranging between 3000 psig and 5000 psig, the working fluid outside of the extendable member 12 prior to loading is estimated to weigh between roughly 11 lbs and 19 lbs (5 kg and 9 kg) and occupy between 0.2 ft$^3$ and 0.33 ft$^3$ (0.006 m$^3$ and 0.009 m$^3$). Although these mass and volume values do not account for the initial volume and mass of the system, their small magnitudes serve to indicate that an elastomeric accumulator 10 should theoretically be a viable option for HRB application.

Extendable Member Properties

In an embodiment of the present invention, a extendable member 12 may be constructed of an appropriate polyurethane with good extension properties, high stiffness and low hysteresis. The extendable member 12 may be a room temperature curable polyurethane which allows the extendable member 12 to be cast using a disposable wax mold that is subsequently melted away from the finished extendable member 12. The following are the dimensions of the extendable member 12: about 6.2 inches long (4.2 inches of gage length when unstretched and 2 inches of gripping length) and an outer diameter of about 2 inches. In other embodiments, the extendable member 12 has a length of from about 5 inches to about 7 inches, and an outer diameter of from about 1 inch to about 4 inches.

Using the equation for energy stored per unit volume, Eq. (8), in conjunction with the polynomial estimating the stress-strain curve allows theoretical volumetric energy density values to be obtained for different extension ratios of the material.

$$u = \int \sigma d\epsilon \quad (8)$$

In Eq. (8), $\sigma$ is the stress (Pa), $\epsilon$ is the extension ratio, and $\epsilon f$ is the extension ratio at which the volumetric energy density is to be calculated.

Embodiments of the Present Invention

Referring now to FIG. 5, there is shown an embodiment of the present invention having a plurality of extendable members 12. While the figure shows two extendable members 12 any number of extendable members 12 and corresponding clamping devices may be used to achieve the desired characteristics.

Referring now to FIG. 6A, there is shown an alternate embodiment in which the second clamp 30 is positioned next to the piston 22, with the second end 20 of the extendable member 12 received within an opening in the piston 22. In still another embodiment, as shown in FIG. 6B, the entire second clamp 30 may be received within an opening of the piston 22 such that the first end 24 of the piston 22 is flush with the end of the second clamp 30 that is near the extendable member 12.

Figure 7:
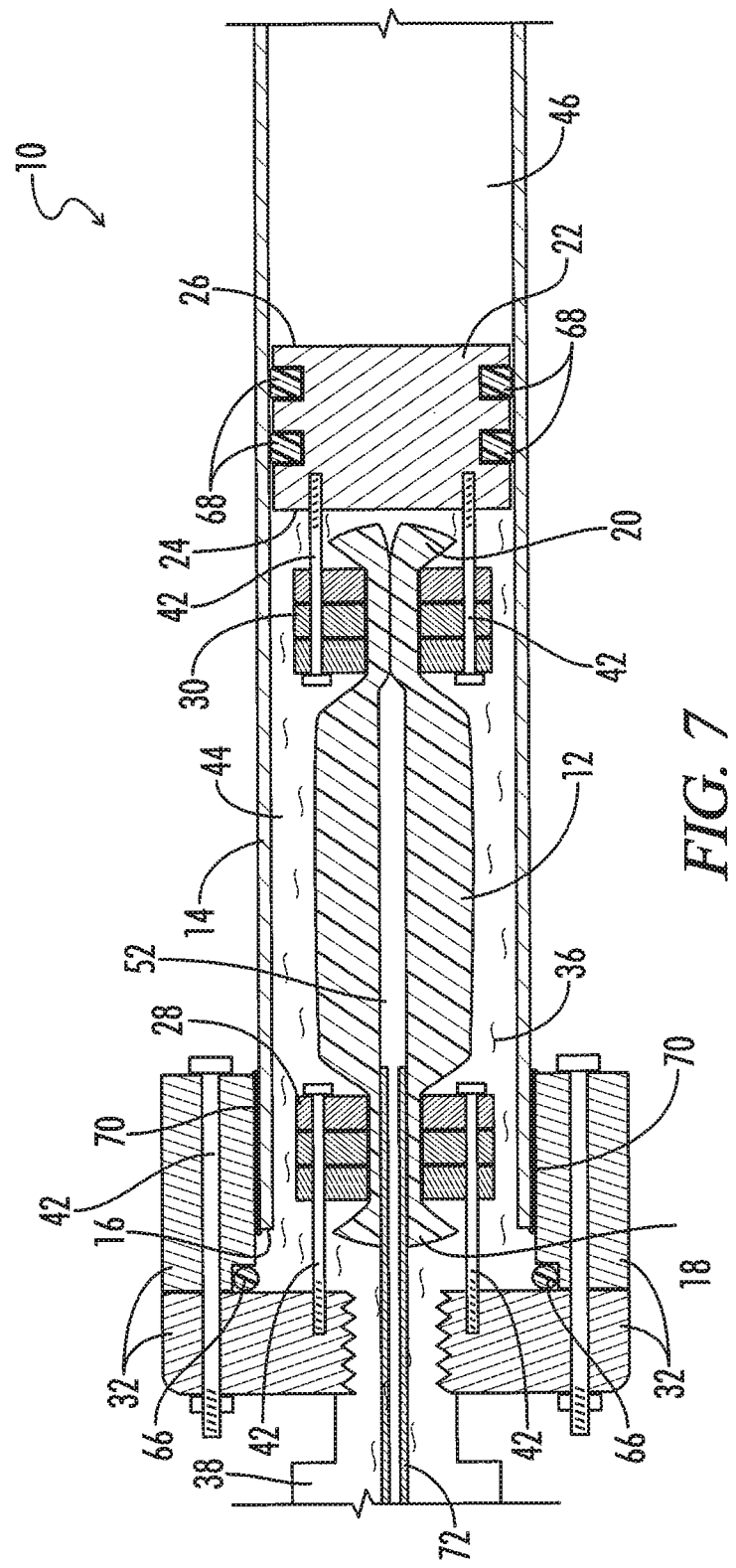
FIG. 7 is a cross-sectional view of an embodiment of the present invention in which the extendable member includes an opening through its center. Also shown is a rigid tube which allows the central opening to remain open. The extendable member being in a non-stretched configuration.

Referring now to FIG. 7, there is shown an embodiment of the present invention in which the extendable member 12 has an opening 52 therethrough along its axis of length. While a single opening is shown in the figure, clearly, a plurality of such openings in the direction of the axis may be used in alternate embodiments to achieve desired characteristics. In certain embodiments of the present invention, it may be desired to allow the working fluid 36 to enter the opening 52 within the extendable member 12. In such embodiments, a tube 72 may be placed at the section of the extendable member 12 being clamped so that the opening 52 is not clamped shut. The tube 72 being constructed of a material sufficiently rigid so that it withstands clamping pressure. In other embodiments, if it is desired that fluid 36 not be pumped into the opening 52, then the tube 72 may be sealed to prevent fluid 36 from entering the opening 52. In still other alternate embodiments of the present invention, the opening 52 of the extendable member 12 is not circular, and may have a multi-lobed oval shape. In certain embodiments of the present invention, the opening 52 of the extendable member 12 has grooves.

Figure 8A:
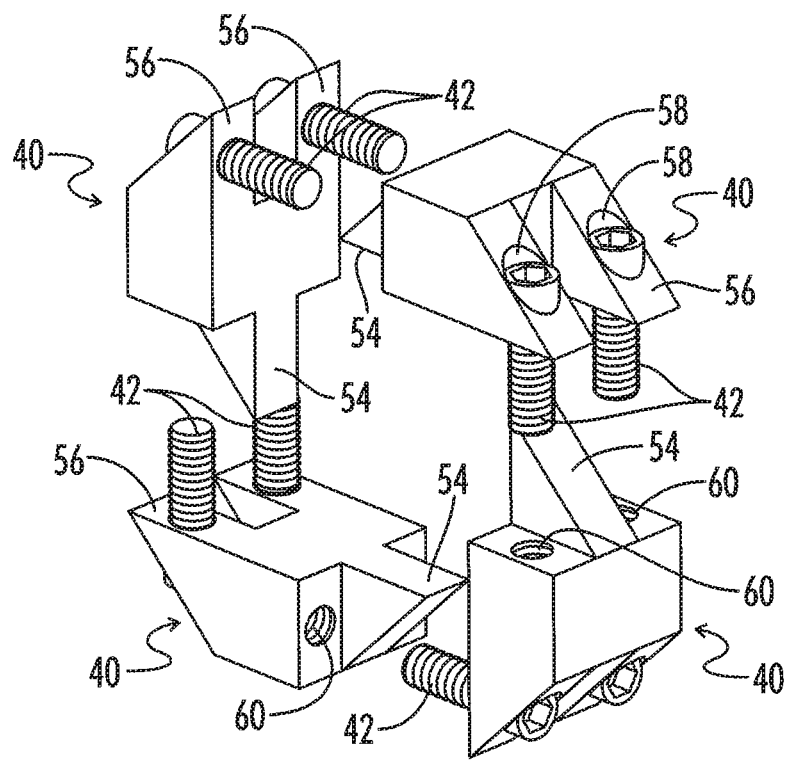
FIGS. 8A and 8B are perspective views of an embodiment of a clamp as disclosed herein.
Figure 8B:
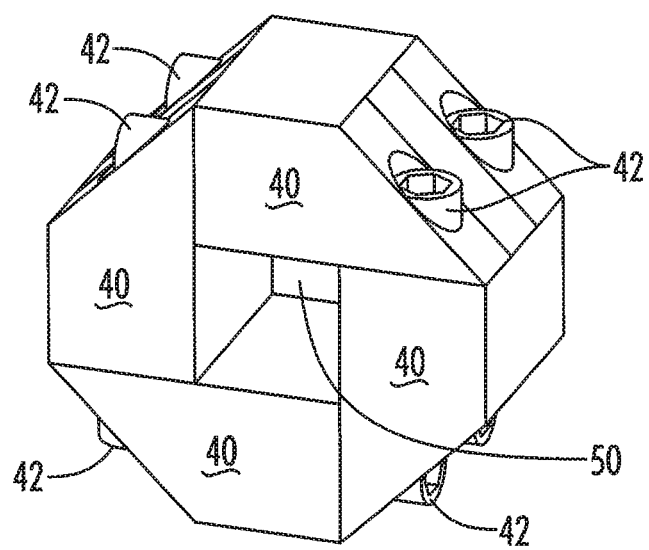

Referring now to FIG. 8A, there is shown several clamping members 40 which are positioned to be assembled into a clamping device. Shown in FIG. 8B are the positions of the clamping members 40 when the clamping device is assembled and clamped to its closed position. The special feature of the clamping device is that clamping is accomplished with only a slidable engagement of the elastomer material such that there is no binding or tearing of the material during the clamping process. That is, in an embodiment that has an extendable member 12 having a square cross-sectional shape, then a square-bore clamping device is used. In certain embodiments, the cross-sectional shape of the extendable member 12 matches the opening 50 of the clamping device. Those shapes may be circular, oval, any convex polygon, or the like, as known to those of skill in the art. In other embodiments, the clamping device may include self tightening mechanisms, such as springs. The clamping members 40 shown are one of many embodiments which are available. The clamping member 40 includes a body 54 and two flanges 56. Each flange 56 has a first opening 58 and a second opening 60. Specifically, the two flanges 56 defining openings through which fasteners 42, such as screws, are inserted are for applying clamping pressure as the fasteners 42 are tightened in a sequential manner. Other embodiments such as having fewer or more openings for fasteners 42 may be designed.

Figure 9:
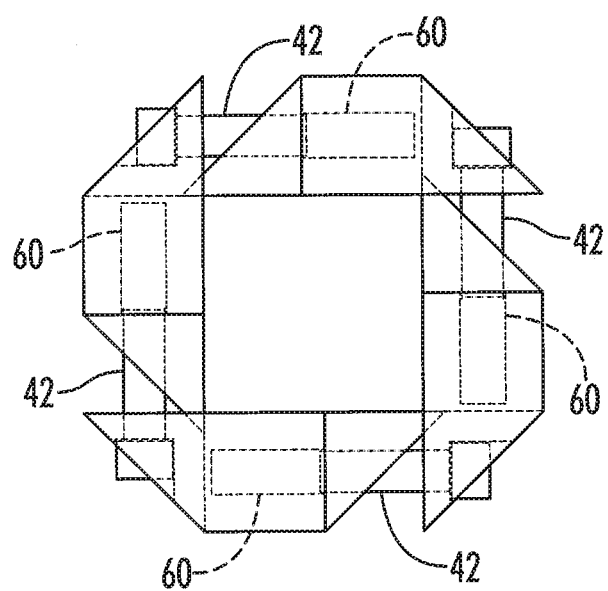
FIG. 9 is a side view of an embodiment of a clamping device when four of the clamping members are positioned to form a clamp to hold an elastomer. The clamping device is shown in its open configuration. Phantom lines are used to show the positioning of fasteners and the openings into which the fasteners are to be positioned upon closing the clamp.
Figure 10:
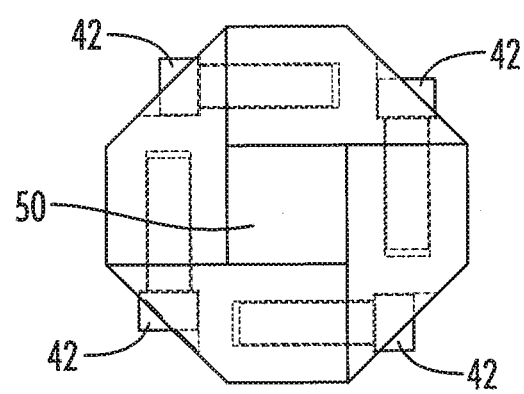
FIG. 10 is a side view of the embodiment shown in FIG. 9 after the fasteners have been sequentially tightened and the embodiment is in a closed configuration such that the opening within the clamping device is approximately 25% of its size when the clamping device was in its open configuration.

Referring now to FIG. 9, there is shown an arrangement and configuration of four clamping members 40 such that a complete clamp defining an opening 50 through which the elastomer material to be clamped is inserted. As the fasteners 42 are sequentially tightened, the opening 50 of the clamping device becomes smaller in order to clamp the elastomer material. In certain embodiments, the opening 50 may be reduced to 25% of its original size. Referring now to FIG. 10, there is shown clamping members 40 configured in a closed configuration due to the sequential tightening of the fasteners 42. The tightening of the clamping device is accomplished by the use of a number of fasteners 42 as needed in order to create the pressure needed to compress the elastomer material. In certain embodiments of the present invention, the clamping members 40 are constructed of a material suitable for the described function, including, for example, steel, aluminum, or the like. Those of ordinary skill in the art are familiar with such materials, which are readily commercially available. Not shown in FIGS. 8-10 are the additional openings or points of attachment needed for the clamping device to attach to other elements of the present invention, such as the cap 32 or the piston 22. Regarding such connections, although FIGS. 1-3 show a single embodiment Applicants note that alternate embodiments of the manner of attaching a clamp 28 or 30 to the cap 32 or piston 22 may be accomplished as known to those of ordinary skill of art, including by fasteners, welding, adhesive, or the like. When a rod 34 is attached to the piston 22, as shown in FIG. 5, such attachment may be accomplished by a screw connection, welding or other attachment as known to those of ordinary skill in the art. Finally, regarding manners of attaching elements within the present invention, for example, Applicant notes that the cap 32 may be attached to the housing 14 as shown in FIGS. 1-3, by use of an adhesive 70, such as epoxy resin, and fasteners 42 bearing down on an o-ring 66 or by any other alternate manner as known to those of ordinary skill in the art. The critical element of the attachment of the cap 32 to the housing 14 is that such connection be fluid tight and capable of enduring the anticipated high pressure resulting from the intended use of the invention. Regarding attachment of fluid conduits 62 and 64, they may be constructed of any material which is proper for the use and function described herein. Examples of such conduits are well known to those of ordinary skill in the art, and include hydraulic hose, hydraulic piping, or the like. In certain embodiments, connecting the fluid conduits to the pump/motor 48 includes standard fluid tight connections known to those of ordinary skill in the art, which are well known and readily commercially available. Such connections may include a compression fitting connection. Regarding any of the fluid tight junctions described herein, connectors for providing such junctions are well known to those of ordinary skill in the art and the materials needed for the same are readily commercially available.

As used herein, the extendable member 12 may also be referred to as an expansion member, or other suitable term which is descriptive of the functions disclosed herein. In certain embodiments, the extendable member 12 is constructed of a material capable of performing the functions described herein. In certain embodiments of the invention, the extendable member 12 is an elastomer. In other embodiments, the extendable member 12 is polyurethane, nitrile rubber, polyisoprene, another engineered elastomer, or natural rubber. Such materials are readily commercially available. In still other embodiments of the present invention, an appropriate energy storing material for the extendable member 12 is a material having a high volumetric energy density, a high gravimetric (or mass specific) energy density, and the ability to store the captured energy efficiently for a duration on the order of minutes. In still other embodiments of the present invention, the extendable member 12 may be constructed of another known material which is suitable as known to those of ordinary skill in the art. Those of ordinary skill in the art are familiar with the molding and construction techniques that are used to manufacture a extendable member 12 having the qualities and characteristics as described herein. Further, those manufacturing services are readily commercially available.

Efficient Energy Storage by the Extendable Member

As used herein, yield strength has the same meaning as is known to one of ordinary skill in the art. That is, the yield strength of a material is the stress at which the material begins to deform plastically. A minimum yield strength means that the material has a yield strength of at least the given psi. For example, in certain embodiments of the present invention, the extendable member 12 has a minimum yield strength of about 1000 psi.

In certain embodiments of the present invention, the material of construction of the extendable member 12 is a material exhibiting elastic behavior to strains of at least 1. Stress-strain curves provide information about the expansion behavior of a material. A number of elastomeric materials display hyperelastic expansion behavior. Such materials are highly desirable for use as a extendable member 12. Another favorable characteristic observed in smaller extendable members made of hyperelastic material, and one which is highly desirable in extendable member 12, is the absence of statistically significant decreases in energy density and roundtrip efficiency all the way up to failure.

As best seen in the FIGS. 1-3, the extendable member 12 is housed within the housing 14, and may be a generally square or rectangular shape. In still other embodiments of the present invention, the extendable member 12 may be a similar shape, such as a circle, oval, octagon, hexagon, or the like, as generally known to those of skill in the art. Accordingly, in certain embodiments of the present invention, the housing 14 may also have such similar shapes. Further, the clamping device disclosed herein may be altered to allow its "closed" configuration to match or approximately match the shape of the extendable member 12, whether it be hexagon, octagon, or the like.

Figure 13:
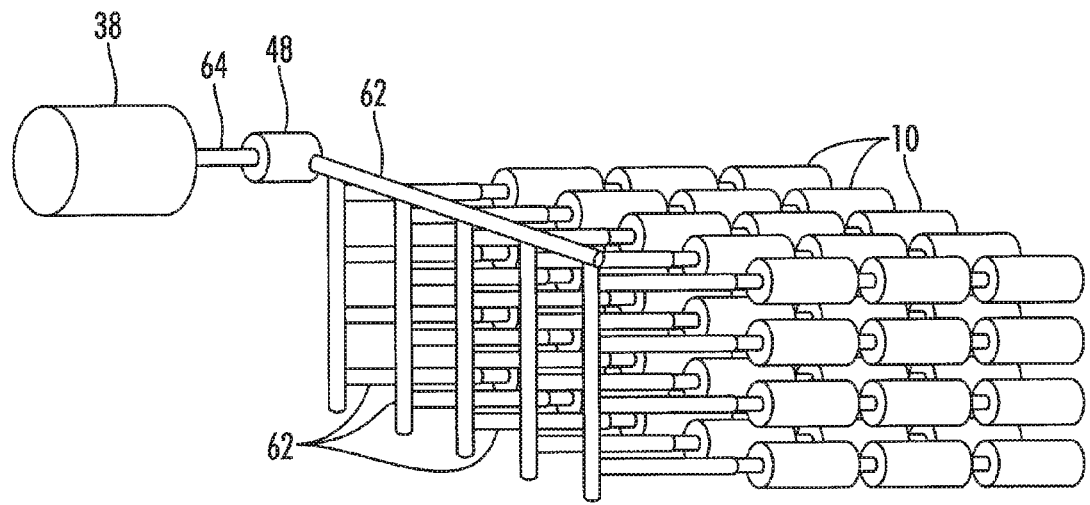
FIG. 13 is a schematic diagram of an embodiment of the invention in which accumulators are arranged in series and parallel.

In certain embodiments of the present invention, the extendable member 12 may have a length of from about 4 inches to about 8 inches, and an outer diameter of from about 1 inch to about 3 inches. In certain embodiments of the invention, the proportions of the housing 14, are in relation to the size characteristics of the extendable member 12. Accordingly, in relation to the size characteristics of the extendable member 12 disclosed above, in certain embodiments, the housing 14 may have a length of from about 16 inches to about 26 inches. In other embodiments of the present invention, the length of the housing 14 may be from about 20 inches to about 22 inches. In certain embodiments of the present invention, the outer diameter of the housing 14 is about 2.25 inches. In still other embodiments of the present invention, the outer diameter of the housing 14 may be from about 1.25 inches to about 3.25 inches. In still other embodiments of the present invention, the thickness of the housing 14 may be from about 0.12 inches to about 0.14 inches. In yet other embodiments of the invention, the thickness of the housing 14 may be from about one eighth of an inch to about one fourth of an inch. As known of those in the ordinary skill in the art, the thickness of the housing 14 is dependent upon the desired maximum rated pressure for the housing 14. In certain embodiments of the invention, the housing 14 has a pressure rating of at least 2000 psi. As further noted below, those of ordinary skill in the art understand that the dimensions of the present invention may change as the desired energy storage capacity changes. In a certain embodiment, as shown in FIG. 13, an accumulator 10 system capable of storing 200 kJ of energy may occupy a space of less than three cubic feet, it would include an array of about 20 accumulators cylinders stacked in parallel, each with three cylinders in series, each having an outer diameter of about 2.25 inches and having a length of about 21 inches. The extendable member 12 in each cylinder housing 14 may have an outer diameter of about 2 inches and a length of about 6.2 inches. In such embodiment, with 300% strain in the elastomer capacity, the piston 22 within each housing 14 may move from about 6.5 inches to about 20 inches from the cap 32. The accumulators 10 may be positioned in parallel with a 90% packing efficiency.

Still referring to the housing 14, in addition to thickness, the material of construction is relevant. In certain embodiments of the present invention, the material of construction of the housing 14 is a rigid structural material capable of providing fluid tight containment of the fluid 36. In certain other embodiments of the present invention, the housing 14 is constructed of steel, carbon fiber, polycarbonate, woven pressure vessel materials, fiberglass, aluminum, or the like. In certain embodiments of the invention, the housing 14 may include a lining of appropriate material to complement the fluid bearing function which the housing 14 serves. Those of ordinary skill in the art are familiar with such materials, which are readily commercially available. Methods of fabricating a housing 14 of such materials are well known to those of ordinary skill in the art, and such fabrication services are readily commercially available. As known to those of ordinary skill in the art, the invention disclosed herein is scalable to accomplish the magnitude of desired energy storage. Accordingly, while specific dimensions are provided herein, one of ordinary skill in the art is familiar with the modification of those dimensions in order to accomplish specific energy storage characteristics based upon the industry in which the system 10 is applied.

In still other embodiments of the present invention, the accumulator 10 may be in use in a vehicle such that the housing 14 is fixedly attached to a structure component of the vehicle which is near. In still other embodiments of the present invention, the housing 14 may be attached to a bracket or arm for attachment to a vehicle. In certain embodiments of the present invention, the housing 14 may be attached to a single bracket or a plurality of brackets, so that the housing 14 is attached to the vehicle (not shown) through such brackets.

In certain embodiments, the accumulator 10 includes a pump/motor 48, be it a hydraulic pump or another mechanism capable of providing flow at desirable pressure. Such pump/motors are readily commercially available and well known to those of ordinary skill in the art. Examples of commercially available pump/motors 48 include variable displacement hydraulic pump/motors, or the like. The pump/motor 48 will be the energy source which will serve to provide the accumulator 10 with energy via a fluid flow, which the accumulator 10 will store as strain energy. Likewise, the accumulator 10 can return its stored energy by providing a flow at a high pressure to the pump/motor 48 or other fluid powered device. In a vehicular system, such a fluid 36 may be hydraulic fluid. In certain embodiments, the pump/motor 48 moves the hydraulic fluid at sufficient pressure to push the hydraulic fluid 36 into the first chamber 44 in order to stretch the extendable member 12 of the accumulator 10.

By way of example, as a vehicle rolls to a stop, the pump/motor 48 starts pumping fluid 36 into the first chamber 44. The pump/motor 48 is physically connected to the power train of the vehicle. By the time the vehicle comes to a stop the extendable member 12 will have partially or fully stretched along its axis. As the vehicle starts to move, the pump/motor 48 reverses its function so that the pressurized fluid is released from the first chamber 44 and the strain energy is used to assist the vehicle in acceleration. The process may be repeated again regardless of whether or not the extendable member 12 returns to its unstrained length. As known to those of ordinary skill in the art, such an embodiment may use hydraulic actuators and valves. Such actuators and valves are well known in the art and are readily commercially available.

Figure 11:
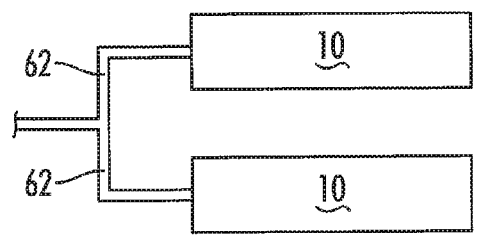
FIG. 11 is a schematic diagram of an embodiment of the invention in which accumulators are arranged in a parallel configuration.
Figure 12:
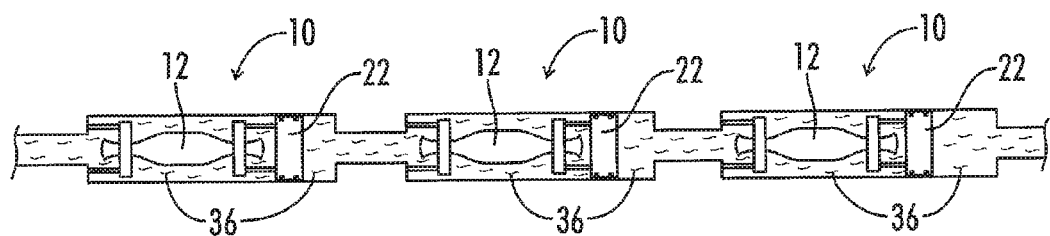
FIG. 12 is a schematic diagram of an embodiment of the invention in which the accumulators are arranged in a series configuration.

Referring now to FIGS. 11-12, an additional benefit of the present invention is that accumulators 10 may be arranged in parallel configuration, series configuration, or both. FIG. 11 shows a standard parallel configuration. The amount of new working fluid 36 of the accumulator 10 may be increased by connecting multiple high pressure ports in parallel. FIG. 12 shows a series configuration. Arrangement in a series configuration requires linking the second chamber 46 of one accumulator 10 to the first chamber 44 of another accumulator 10, with the intervening volume being sealed and filled with working fluid 36. The differential pressures result in a linear increase in the charging pressure of the working fluid 36. Such series configuration offers a hydraulic transmission ratio relating net fluid 36 volume utilized and fluid 36 pressure. To be clear, fluid 36 may flow freely from the low pressure side of the first accumulator 10 to the high pressure side of the next accumulator 10 unhindered by the mechanism which anchors each extendable member 12 to its respective end cap. In still other embodiments, accumulators 10 may be arranged in both parallel and series configurations to achieve a desired hydraulic transmission ratio with any desired housing 14 diameter. Doing so allows utilization of a high strain energy density elastomer in order to minimize the volume of elastomer used and to maintain a housing 14 diameter suited to the space requirements of the application into which the accumulator 10 is installed.

In yet another embodiment, the invention disclosed herein may be used for short term storage of energy. By way of illustration, and not limitation, such short term energy storage, such as, for peak shifting in relation to energy use of buildings. For this application, the pump/motor would engage an electric motor and/or generator.

All references, publications, and patents disclosed herein are expressly incorporated by reference.

Thus, it is seen that the accumulator of the present invention readily achieves the ends and advantages mentioned as well as those inherent therein. While certain preferred embodiments of the invention have been illustrated and described for purposes of the present disclosure, numerous changes in the arrangement and construction of parts may be made by those skilled in the art, which changes are encompassed within the scope and spirit of the present invention, as defined by the following claims.

What is claimed is:

1. An accumulator, comprising:
a housing having a first end;
a cap attached to the first end of the housing;
a first clamp attached to the cap;
an elastomeric extendable member having a first end and a second end, the first end being attached to the first clamp, the elastomeric extendable member being within the housing;
a second clamp attached to the second end of the elastomeric extendable member;
a piston attached to the second clamp, wherein the piston slidably engages the housing; and
a working fluid source in fluid communication with the cap, wherein:
the elastomeric extendable member defines an opening therethrough along its axis;
the elastomeric extendable member isolates the opening therethrough along its axis from the working fluid; and
the piston separates the housing into a first chamber and a second chamber.

2. The accumulator of claim 1, wherein the elastomeric extendable member defines a plurality of openings therethrough along its axis.

3. The accumulator of claim 1, further comprising a tube attached to the working fluid source and the tube being inserted in the opening at the first end of the elastomeric extendable member so that fluid may pass into the opening.

4. The accumulator of claim 1, further comprising the piston defining an opening, wherein the second end of the extension member is received by the opening.

5. The accumulator of claim 4, wherein the second clamp is received by the opening.

6. An accumulator comprising:
a tubular housing having a first end;
a piston having a first end and a second end, the piston slidably engaging the tubular housing wherein the piston separates the housing into a first chamber and a second chamber;
a cap attached to the first end of the tubular housing, wherein the first chamber of the housing is defined by the housing, the cap and first end of the piston so that the volume of the first chamber changes as the position of the piston changes;
a first clamp attached to the cap;
an elastomeric extendable member having a first end and a second end, the first end being attached to the first clamp; and
a second clamp attached to the first end of the piston and the second end of the extendable member, wherein:
the elastomeric extendable member defines an opening therethrough along its axis; and
wherein the elastomeric extendable member isolates the opening therethrough along its axis from the first chamber.

7. The accumulator of claim 6, wherein the elastomeric extendable member defines a plurality of openings therethrough along its axis.

8. An accumulator, comprising:
- a housing having a first end, wherein the first end of the housing defines an opening so that working fluid may pass;
- a first clamp attached to the first end of the housing;
- an elastomeric extendable member having a first end and a second end, the first end being attached to the first clamp, the extendable member being within the housing, wherein:
  - the elastomeric extendable member defines an opening therethrough along its axis;
  - wherein the elastomeric extendable member isolates the opening therethrough along its axis from the working fluid; and
  - the piston separates the housing into a first chamber and a second chamber;
- a second clamp attached to the second end of the extendable member;
- a piston attached to the second clamp, wherein the piston slidably engages the housing; and
- a plurality of accumulators arranged in series and in parallel.

\* \* \* \* \*